United States Patent
Schneider et al.

(10) Patent No.: US 7,267,283 B2
(45) Date of Patent: Sep. 11, 2007

(54) MANAGEMENT OF DATA CAPTURE SYSTEMS

(75) Inventors: Gary G. Schneider, Stony Brook, NY (US); Matthew Blasczak, Coram, NY (US); James Giebel, Centerport, NY (US); Edward Barkan, Miller Place, NY (US); William Sackett, Rocky Point, NY (US); Costanzo Difazio, East Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 287 days.

(21) Appl. No.: 10/999,341

(22) Filed: Nov. 30, 2004

(65) Prior Publication Data

US 2006/0138209 A1    Jun. 29, 2006

(51) Int. Cl.
*G06K 7/10* (2006.01)
(52) U.S. Cl. .............................. 235/472.01; 235/462.01
(58) Field of Classification Search ..............................
235/462.01–462.47, 472.01, 472.02, 472.03, 235/454, 455, 470
See application file for complete search history.

(56) References Cited

U.S. PATENT DOCUMENTS

| | | | | |
|---|---|---|---|---|
| 5,157,687 A | * | 10/1992 | Tymes | 375/140 |
| 5,260,554 A | * | 11/1993 | Grodevant | 235/462.31 |
| 5,804,809 A | * | 9/1998 | Eastman et al. | 235/462.42 |
| 6,474,555 B1 | * | 11/2002 | Tsunobuchi et al. | 235/462.01 |
| 6,577,609 B2 | * | 6/2003 | Sharony | 370/312 |
| 7,132,947 B2 | * | 11/2006 | Clifford et al. | 340/572.3 |
| 2004/0004128 A1 | * | 1/2004 | Pettinelli et al. | 235/462.41 |
| 2005/0185684 A1 | * | 8/2005 | Stewart et al. | 372/29.02 |
| 2006/0016891 A1 | * | 1/2006 | Giebel et al. | 235/454 |
| 2006/0138209 A1 | * | 6/2006 | Schneider et al. | 235/375 |

FOREIGN PATENT DOCUMENTS

JP        2002083263 A   *   3/2002

* cited by examiner

*Primary Examiner*—Thien Minh Le
(74) *Attorney, Agent, or Firm*—Kirschstein, et al.

(57) ABSTRACT

The operating condition of data capture systems, such as electro-optical readers, RFID readers, and imagers, is monitored and reported to a host which preferably modifies the operating condition when the latter is outside a preestablished setting.

23 Claims, 3 Drawing Sheets

MANAGEMENT OF DATA CAPTURE SYSTEMS

BACKGROUND OF THE INVENTION

1. Field of the Invention

The present invention generally relates to management of data capture systems, such as electro-optical readers, preferably laser scanners for reading indicia, such as bar code symbols, as well as imagers for capturing an image of such indicia, as well as radio frequency identification (RFID) devices for identifying targets and, more particularly, to bidirectional communications between a data capture system and a remote host for status and error reporting, upgrading and like management functions.

2. Description of the Related Art

Various electro-optical systems or readers have been developed for reading indicia such as bar code symbols appearing on a label or on a surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the pattern of the graphic indicia into a time-varying electrical signal, which is digitized and decoded into data relating to the symbol being read.

Typically, a laser beam from a laser is directed along a light path toward a target that includes the bar code symbol on a target surface. A moving-beam scanner operates by repetitively sweeping the laser beam in a scan line or a series of scan lines across the symbol by means of motion of a scanning component, such as the laser itself or a scan mirror disposed in the path of the laser beam. Optics focus the laser beam into a beam spot on the target surface, and the motion of the scanning component sweeps the beam spot across the symbol to trace a scan line across the symbol. Motion of the scanning component is typically effected by an electrical drive motor.

The readers also include a sensor or photodetector which detects light along the scan line that is reflected or scattered from the symbol. The photodetector or sensor is positioned such that it has a field of view which ensures the capture of the reflected or scattered light, and converts the latter into an electrical analog signal.

In retroreflective light collection, a single optical component, e.g., a reciprocally oscillatory mirror, such as described in U.S. Pat. No. 4,816,661 or U.S. Pat. No. 4,409,470, both herein incorporated by reference, sweeps the beam across the target surface and directs the collected light to the sensor. In non-retroreflective light collection, the reflected laser light is not collected by the same optical component used for scanning. Instead, the sensor is independent of the scanning beam, and has a large field of view so that the reflected laser light traces across the sensor.

Electronic control circuitry and software decode the electrical analog signal from the sensor into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process usually works by applying the digitized signal to a microprocessor running a software algorithm, which attempts to decode the signal. If a symbol is decoded successfully and completely, the decoding terminates, and an indicator of a successful read (such as a green light and/or audible beep) is provided to a user. Otherwise, the microprocessor receives the next scan, and performs another decoding into a binary representation of the data encoded in the symbol, and to the alphanumeric characters so represented. Once a successful read is obtained, the binary data is communicated to a host computer for further processing, for example, information retrieval from a look-up table.

Both one- and two-dimensional symbols can be read by employing moving-beam scanners, as well as solid-state imagers. For example, an image sensor device may be employed which has a one- or two-dimensional array of cells or photosensors which correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two-dimensional array of pixel information for a field of view.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to use radio waves to automatically identify objects, people, or like targets. An RFID tag or transponder identifies a target. An RFID reader interrogates the tag and converts radio waves reflected back from the tag into digital data.

As satisfactory as such moving-beam scanners, imagers and RFID devices are in capturing data, such data capture systems do not have status or error reporting capabilities. When operating problems arise in such systems, much time and effort are required to report the problem, diagnose the problem, and service the problem. It is up to a human user to detect the problem and initiate the process of reporting the failure. This can lead to costly disruptions due to the system being out of service. Servicing generally requires the system to be disassembled for repair. Sometimes, the user has insufficient expertise to recognize the onset of a system problem and delays reporting until a complete system failure has occurred.

SUMMARY OF THE INVENTION

OBJECTS OF THE INVENTION

Accordingly, it is a general object of this invention to add status reporting and error reporting functionality to data capture systems.

It is an additional object of the present invention to enable a data capture system to communicate its operating parameters to a host which, in turn, communicates corrective action to the data capture system.

It is another object of the invention to monitor operation of a data capture system and to change the operation, if necessary.

It is a further object of the present invention to provide management communication between a data capture system and a host.

FEATURES OF THE INVENTION

In keeping with the above objects and others which will become apparent hereinafter, one feature of the present invention resides, briefly stated, in an arrangement for, and a method of, managing a data capture system such as an electro-optical reader for reading indicia, such as bar code symbols, or an imager for imaging a target, or an RFID reader for interrogating a target with radio waves, by locating a host remotely from the system, by monitoring various operating conditions of the system, and by reporting each monitored operating condition to the host. Preferably, the host performs an affirmative action, for example, deactivating the system when the monitored operating condition is outside a preestablished setting.

In one arrangement, the electrical current passing through a laser of the reader and/or the output power level of the laser is directly monitored and, if preestablished settings are not met, the laser is deenergized. In another arrangement, the laser includes a laser diode, and a monitor photodiode for monitoring the output power of the diode. If preestablished settings for the monitor photodiode are not met, the laser is deenergized. In yet another arrangement, the temperature of the reader is monitored, and the laser is deenergized if the monitored temperature is outside acceptable levels.

The reader may include a movable scan component, such as a scan mirror, driven by a drive at a prescribed amplitude and frequency over a scan angle so that a scan line is traced over the symbol. The laser is deenergized if the amplitude and/or frequency lies outside preestablished settings for these parameters.

Whenever the laser is deenergized or the system is deactivated, this signifies that a reader malfunction has occurred, or may be imminent, in which case, removal of the laser from its source of power discontinues the generation of the laser beam, or deactivation of the system, each serves not only as a safety measure, but also as a management and maintenance tool.

The reporting of status of and errors in the operating condition to the host enables the host to take corrective action, often before the human operator is aware of an imminent system malfunction. The host can upgrade the system, thereby minimizing field maintenance and repair.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
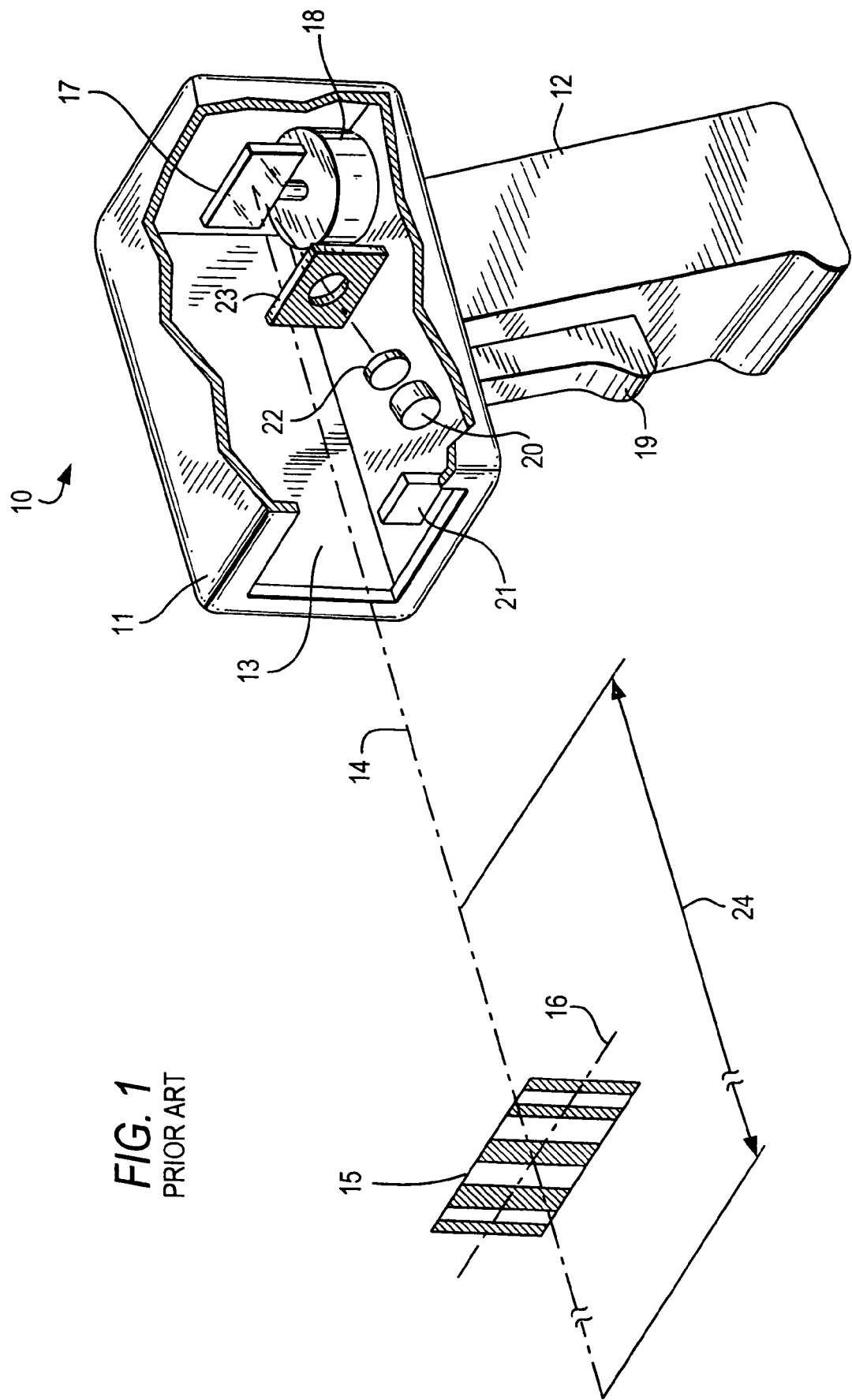
FIG. 1 is a perspective view of an electro-optical reader in accordance with the prior art.

As used herein, the term "symbol" broadly encompasses not only symbol patterns composed of alternating bars and spaces of various widths as commonly referred to as bar code symbols, but also other one- or two-dimensional graphic patterns, as well as alphanumeric characters. In general, the term "symbol" may apply to any type of pattern or indicia which may be recognized or identified either by scanning a light beam and detecting reflected or scattered light as a representation of variations in light reflectivity at various points of the pattern or indicia. FIG. 1 shows an indicia 15 as one example of a "symbol" to be read.

FIG. 1 depicts a handheld laser scanner device 10 for reading symbols. The laser scanner device 10 includes a housing having a barrel portion 11 and a handle 12. Although the drawing depicts a handheld pistol-shaped housing, the invention may also be implemented in other types of housings such as a desk-top workstation or a stationary scanner. In the illustrated embodiment, the barrel portion 11 of the housing includes an exit port or window 13 through which an outgoing laser light beam 14 passes to impinge on, and scan across, the bar code symbol 15 located at some distance from the housing.

The laser beam 14 moves across the symbol 15 to create a scan pattern. Typically, the scanning pattern is one-dimensional or linear, as shown by line 16. This linear scanning movement of the laser beam 14 is generated by an oscillating scan mirror 17 driven by an oscillating motor 18. If desired, means may be provided to scan the beam 14 through a two-dimensional scanning pattern, to permit reading of two-dimensional optically encoded symbols. A manually-actuated trigger 19 or similar means permit an operator to initiate the scanning operation when the operator holds and aims the device 10 at the symbol 15.

The scanner device 10 includes a laser source 20 mounted within the housing. The laser source 20 generates the laser beam 14. A photodetector 21 is positioned within the housing to collect at least a portion of the light reflected and scattered from the bar code symbol 15. The photodetector 21, as shown, faces toward the window 13 and has a static, wide field of view characteristic of the non-retro-reflective readers described above. Alternatively, in a retro-reflective reader, a convex portion of the scan mirror 17 may focus collected light on the photodetector 21, in which case the photodetector faces toward the scan mirror. As the beam 14 sweeps the symbol 15, the photodetector 21 detects the light reflected and scattered from the symbol 15 and creates an analog electrical signal proportional to the intensity of the collected light.

A digitizer (not shown) typically converts the analog signal into a pulse width modulated digital signal, with the pulse widths and/or spacings corresponding to the physical widths of the bars and spaces of the scanned symbol 15. A decoder (not shown), typically comprising a programmed microprocessor with associated RAM and ROM, decodes the pulse width modulated digital signal according to the specific symbology to derive a binary representation of the data encoded in the symbol, and the alphanumeric characters represented by the symbol.

The laser source 20 directs the laser beam through an optical assembly comprising a focusing lens 22 and an aperture stop 23, to modify and direct the laser beam onto the scan mirror 17. The mirror 17, mounted on a vertical shaft and oscillated by the motor drive 18 about a vertical axis, reflects the beam and directs it through the exit port 13 to the symbol 15.

To operate the scanner device 10, the operator depresses trigger 19 which activates the laser source 20 and the motor 18. The laser source 20 generates the laser beam which passes through the element 22 and aperture 23 combination. The element 22 and aperture 23 modify the beam to create an intense beam spot of a given size which extends continuously and does not vary substantially over a range 24 of working distances. The element and aperture combination directs the beam onto the rotary mirror 17, which directs the modified laser beam outwardly from the scanner housing 11 and toward the bar code symbol 15 in a sweeping pattern, i.e., along scan line 16. The bar code symbol 15, placed at any point within the working distance 24 and substantially normal to the laser beam 14, reflects and scatters a portion of the laser light. The photodetector 21, shown mounted in the scanner housing 11 in a non-retro-reflective position, detects the reflected and scattered light and converts the received light into an analog electrical signal. The photodetector could also be mounted in a retro-reflective position facing the scan mirror 17. The system circuitry then converts the analog signal to a pulse width modulated digital signal which a microprocessor-based decoder decodes according to the characteristics of the bar code symbology rules.

Figure 2:
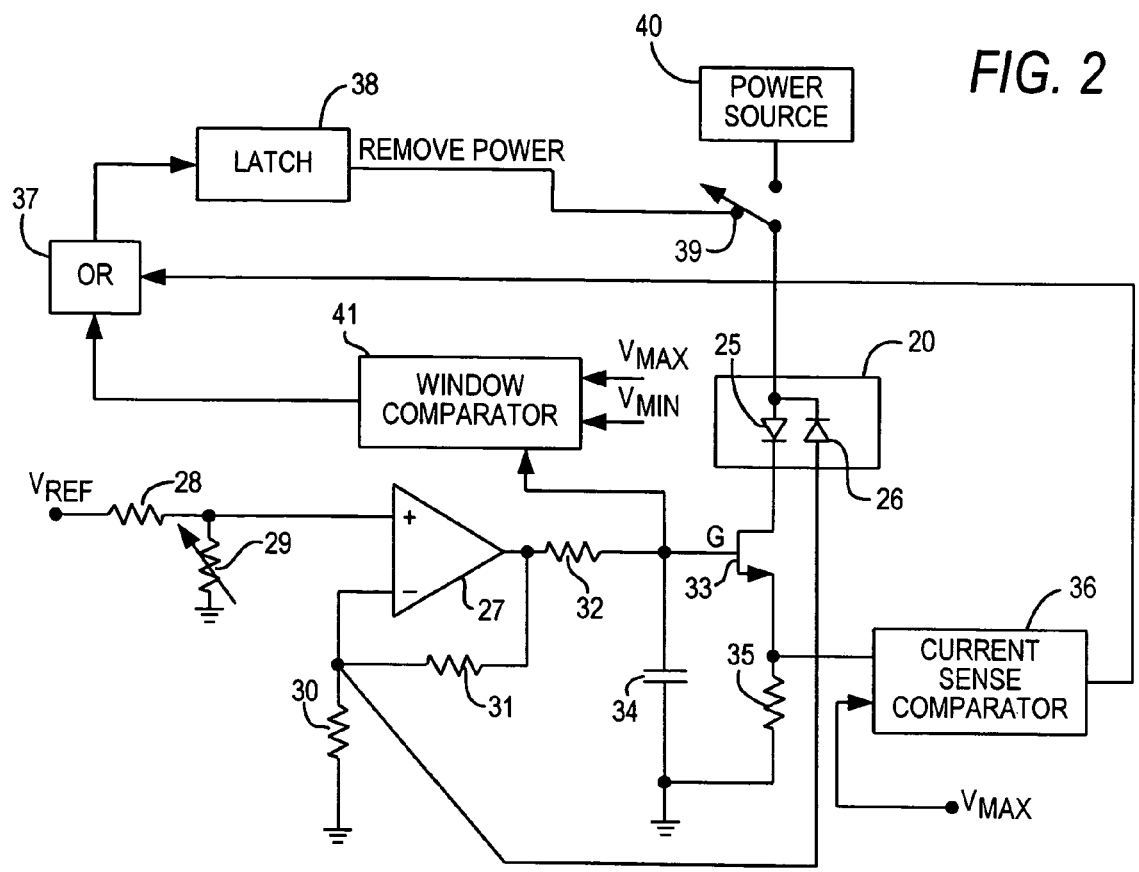
FIG. 2 is a circuit schematic depicting a management arrangement in accordance with the present invention especially useful in the reader of FIG. 1.

As shown in FIG. 2, the laser source 20 includes a laser diode 25 and a monitor photodiode 26 operative for monitoring the output power of the diode 25. The photodiode 26 is part of a feedback circuit operative for maintaining the laser output power constant. The feedback circuit includes a comparator 27 having a reference voltage applied to a positive input of the comparator through a voltage divider comprised of resistors 28, 29. The photodiode 26 is connected to a negative input of the comparator via a resistive network including resistors 30, 31. The output of the comparator 27 is conducted through a resistor 32 and capacitor 34 to a gate G of a field effect transistor (FET) 33. The drain output of the FET 33 is connected to the laser diode 25. The source output of the device 33 is connected to ground through a current sense resistor 35.

The monitor photodiode 26 detects changes in output power of the laser beam emitted by laser diode 25 and sends a feedback signal to the comparator 27 for driving the FET 33 to allow more or less current to pass through the current sense resistor 35 and, in turn, through the laser diode 25. The greater this current, the greater the laser output power, and vice versa.

A current sense comparator 36 has one input connected to the current sense resistor 35 to monitor the current flowing therethrough, and another input connected to a reference voltage that corresponds to the maximum current allowable through the resistor 35. The output of the comparator 36 is connected to an OR gate 37 which, in turn, is connected to a latch 38 and a switch 39, which is connected between a power supply 40 and the laser diode 25. If the comparator 36 senses that the current passing through the resistor 35 exceeds a maximum preestablished value, then an output control signal is conducted to the gate 37 and, in turn, to the latch 38 for opening the switch 39 to remove the power source 40 from energizing the laser diode 25.

In further accordance with FIG. 2, a window comparator 41 is connected to the resistor 32 and monitors the voltage being applied to the gate G of the FET 33. A maximum gate voltage and a minimum gate voltage are also applied to the window comparator 41. The comparator 41 is, in turn, connected to the OR gate 37. If the comparator 41 senses that the gate voltage being applied to the gate G is greater than the preestablished maximum gate voltage, or is less than the preestablished minimum gate voltage, then a signal is sent to the OR gate 37 to operate the latch 38 and open the switch 39, thereby deenergizing the laser diode. Thus, power is removed from the laser diode 25 in the event of malfunction or failure of the monitor photodiode 26, the FET 33, the comparator 27, the laser diode 25, or any circuit connection.

More specifically, the FIG. 2 circuit removes the power source 40 from the laser 20 after detecting an out-of-range condition in the error amplifier 27 that controls the output power of the laser. This circuit will remove power from the laser in the following conditions:

A failure of the device 33 in the output of the laser drive causes excess current to flow through the laser, thereby causing the laser output to exceed the factory set limit.

The monitor diode 26 connection is lost due to a device 33 failure or a circuit connection failure.

The laser fails and the laser drive current significantly increases as resistor 35 is used to sense a high current drive condition.

Advantageously, a timer could be added to the FIG. 2 circuit to remove power only when a malfunction persists for a predetermined time.

Figure 3:
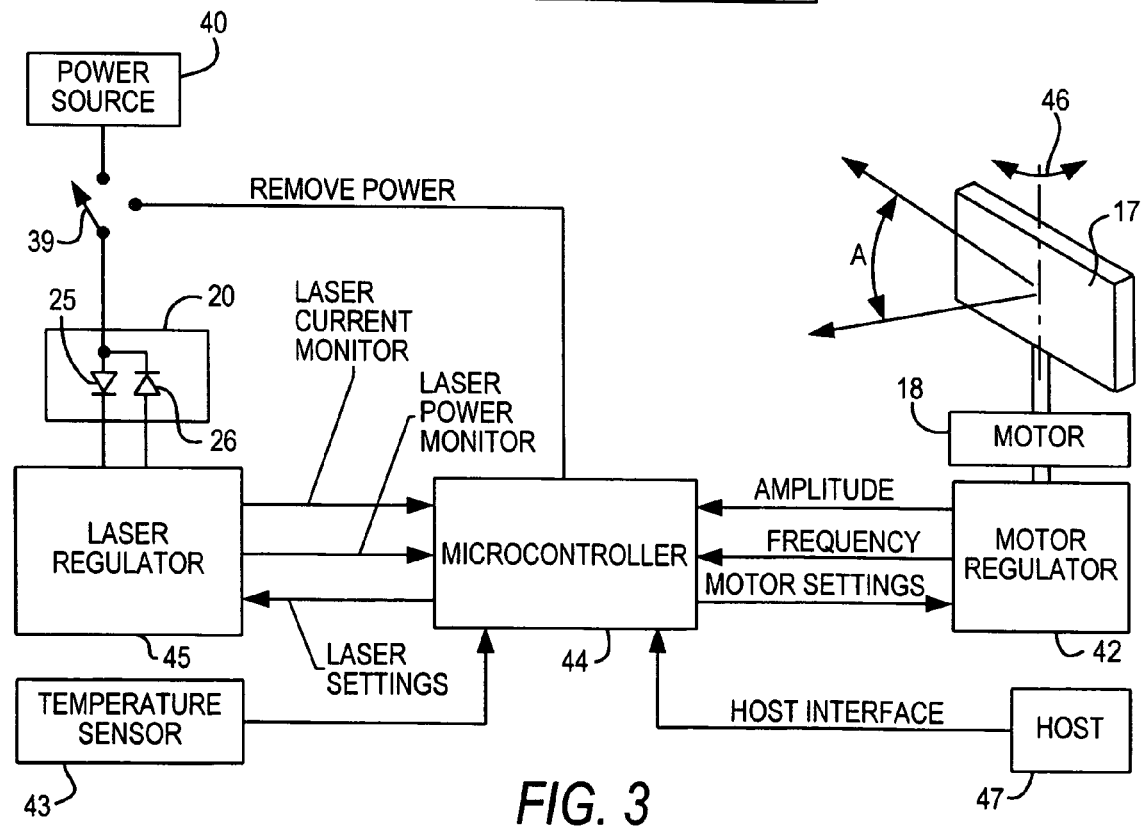
FIG. 3 is a diagrammatic view of additional management arrangements in accordance with the present invention.
Figure 4:
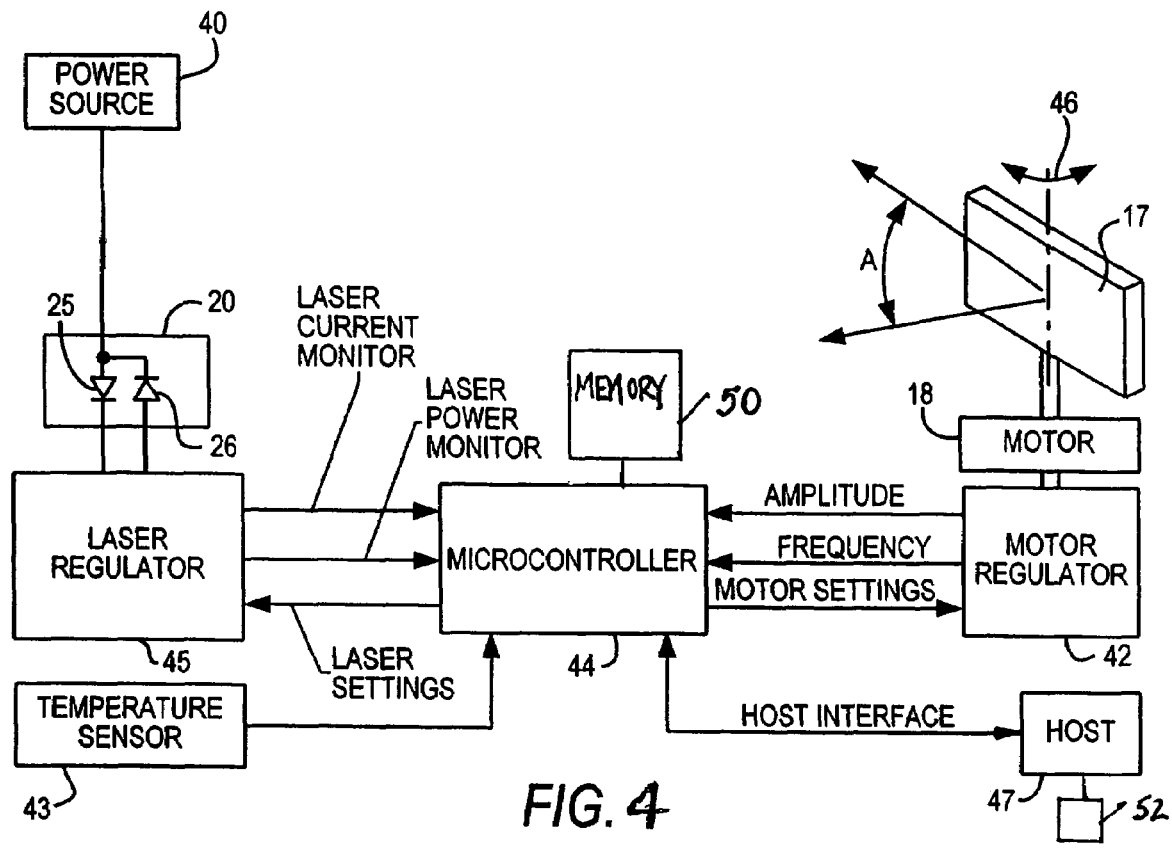
FIG. 4 is a diagrammatic view of still more management arrangements in accordance with the present invention.

As shown in the arrangement of FIG. 3, the laser source 20 is connected to the power source 40 by the switch 39 under control of a microcontroller 44, preferably the same component that decodes the symbol and controls overall reader operation. A temperature sensor 43 is connected to the microcontroller 44 for monitoring the ambient temperature of the reader, preferably in the vicinity of the laser source 20. If the monitored temperature exceeds a preset value, the microcontroller 44 opens the switch 39 to protect the laser source. A laser regulator 45 is connected to the laser source 20 and enables the microcontroller 44 to monitor the laser current and/or the laser output power and, if those values or other laser settings are outside preestablished values for these parameters, then the microcontroller 44 also opens the switch 39 to protect the laser source.

The aforementioned motor 18 for oscillating the scan mirror 17 in alternate circumferential directions denoted by the double-headed arrow 46 is under the control of a motor regulator 42 and the microcontroller 44. The microcontroller itself monitors the amplitude of scan angle A and the frequency of oscillation at which the mirror 17 is oscillated. If these values or other motor settings are outside preestablished values for these parameters, then the microcontroller 44 opens the switch 39. The microcontroller 44 can store the preestablished values, or it can communicate with a remote host 47 to retrieve the preestablished values, or updated values, or communicate to the host the presence of a fault condition, such as a laser or motor fault, or, at the request of the host, communicate operating parameters of the system such as motor frequency, temperature, and/or laser power, or the host can attempt to resolve such problems by initiating and controlling a system calibration episode to correct such faults, i.e., reduce laser power, or increase scan amplitude.

More particularly, as described so far, the microcontroller 44 monitors the amplitude, frequency and settings of the motor regulator 42, as well as the current, power and settings of the laser regulator 45, as well as the temperature detected by the sensor 43 and, in response, controls the power switch 39. Instead of, or in addition to, controlling the switch 39, the microcontroller, in accordance with this invention, sends an output status signal over the host interface to the host 47. In this way, the host 47 monitors the various operating parameters of the data capture system, e.g., the amplitude, frequency and settings of the motor regulator 42, as well as the current, power and settings of the laser regulator 45, as well as the temperature detected by the sensor 43. Preestablished operating parameters, or ranges of such operating parameters, are stored in the host, particularly in a look-up table, in order for the host to determine whether the system is operating within, or outside of, the preestablished parameters. If the system is determined to be operating outside the preestablished parameters, then the host sends an output control signal, in a direction opposite to that of the status signal, to the microcontroller to take action. The action can include shutting off or adjusting power to the laser 20, e.g., by opening the power switch 39, or by shutting off or adjusting power to the motor 18, or by activating an indicator, such as a buzzer or a warning light, to warn that the system requires maintenance.

In accordance with the known art, non-decoded or decoded data indicative of the symbol 15 is transmitted from the microcontroller 44 over the host interface to the remote host 47 and, in turn, data (such as price) is retrieved by the host and transmitted back to the microcontroller over the host interface. In accordance with this invention, maintenance and other control information, not specifically related to the symbol 15, is bidirectionally transmitted over the host interface. Such information includes status reports and error reports. Such information can be transmitted continuously, periodically, or in response to a poll sent by the host. The host physical layer interface can be, a wired interface, for example, I²C, SPI, USB or UART, or it can be a wireless connection, for example, WAN, PAN, or LAN, as described below. The host interface can be a wired or a wireless connection.

A memory 50 is associated with the microcontroller 44 and may store not only the maintenance information for subsequent download to the host, but also identification information, such as the serial number and manufacture date of the data capture system.

The information transmitted to the host need not be merely reported to the host, but preferably causes the host to take some affirmative action. For example, the host can utilize the system's temperature information for general temperature sensing applications. The host can utilize the monitored parameters to determine if field service or recalibration is necessary. The host can utilize the monitored parameters for data mining. The host can utilize the monitored parameters for in-system firmware updates.

System calibration can occur entirely through the host interface. If the host initiates a system calibration, then a security mechanism is employed to thwart malicious hosts from resetting system parameters beyond regulatory limits.

The host 47 is advantageously accessible via an internet browser interface 52. This feature enables systemwide network upgrades by access to the internet.

It will be understood that each of the elements described above, or two or more together, also may find a useful application in other types of constructions differing from the types described above.

Figure 5:
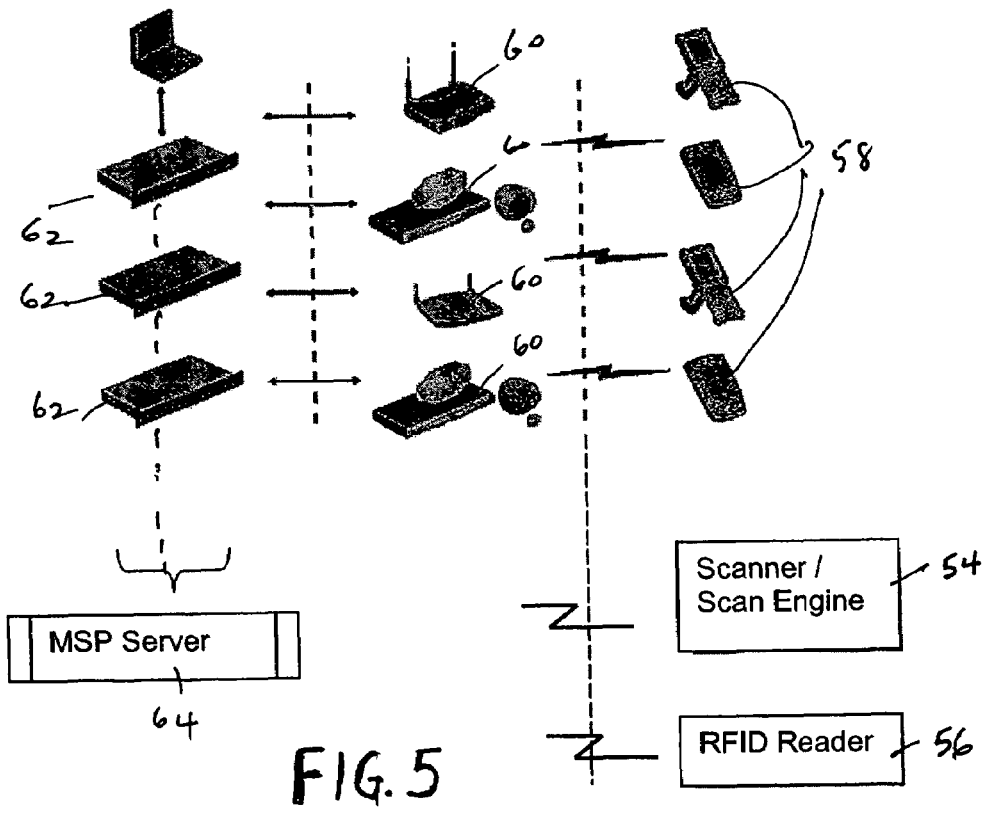
FIG. 5 is a diagrammatic view of system architecture in accordance with the present invention.

For example, FIG. 5 depicts a system architecture for facilitating remote configuration, remote provisioning and remote diagnostics of various data capture systems, such as an electro-optical reader or scanner/scan engine 54, an RFID reader 56, and mobile terminals 58 of various configurations. Each of these systems has a preferably wireless transceiver which communicates over a wireless interface, such as wide area network (WAN), local area network (LAN), or personal area network (PAN), e.g., Bluetooth (trademark), to an enterprise backbone comprising simple network management protocol (SNMP) agents or access points 60, as well as management consoles 62 connected to a mobility service platform (MSP) server 64.

The enterprise backbone obtains status/error/health/diagnostic reporting of the operating condition of the various data capture systems therefrom and, in turn, may send back command and control information, recalibration information, or initiate field upgrade of device software.

While the invention has been illustrated and described as embodied in management of data capture systems it is not intended to be limited to the details shown, since various modifications and structural changes may be made without departing in any way from the spirit of the present invention.

Although described in connection with moving-beam readers, the management control arrangements of this invention can equally well be applied to imaging readers, or RFID readers. In such cases, the monitored operating conditions can include power consumption, power supply voltage, received signal quality and strength, average on-time, average target range, transducer or transceiver sensor properties, and so on.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for managing a data capture system, comprising:
   a) a host remote from the system;
   b) a monitor in the system for monitoring an operating condition of the system, and for detecting a malfunction when the operating condition exceeds a predetermined setting; and
   c) a controller in the system for reporting the malfunction detected by the monitor to the host,
   d) the host being operative for communicating with the system to automatically correct the malfunction.

2. The arrangement of claim 1, wherein the system is an electro-optical reader for reading indicia with a laser beam generated by a laser, wherein the monitor is operative for monitoring the operating condition of the laser, wherein the controller is operative for reporting the laser operating condition to the host, and wherein the host is operative to deenergize the laser when the laser operating condition is not the preestablished setting.

3. The arrangement of claim 2, wherein the preestablished setting for the laser is one of a range of laser current levels and a range of laser power levels, and wherein the host is operative for deenergizing the laser when the laser operating condition is outside one of the ranges.

4. The arrangement of claim 2, wherein the laser includes a laser diode and a monitor photodiode, and wherein the monitor is operative for monitoring the operating condition of the photodiode, and wherein the host is operative for deenergizing the laser when the photodiode operating condition is not the preestablished setting.

5. The arrangement of claim 1, wherein the monitor is operative for monitoring the operating condition of a temperature of the system, and wherein the host is operative for deactivating the system when the temperature operating condition is not the preestablished setting.

6. The arrangement of claim 1, wherein the system is an electro-optical reader for reading indicia with a laser beam generated by a laser, further comprising a movable scan component driven by a drive for scanning the laser beam across the indicia during reading, wherein the monitor is operative for monitoring the operating condition of the drive, and wherein the host is operative for deactivating the system when the drive operating condition is not the preestablished setting.

7. The arrangement of claim 6, wherein the preestablished setting for the drive is one of a range of amplitudes and a range of frequencies at which the scan component is moved, and wherein the host is operative for deactivating the system when the drive operating condition is outside one of the ranges.

8. The arrangement of claim 1, wherein the host transmits a management control signal to the controller when the operating condition monitored by the monitor is outside the preestablished setting.

9. The arrangement of claim 8, wherein the management control signal adjusts the operating condition of the system.

10. The arrangement of claim 8, wherein the management control signal updates the system.

11. The arrangement of claim 8, wherein the host polls the controller to initiate the reporting of the operating condition.

12. The arrangement of claim 1, wherein the system is a radio frequency identification reader for interrogating a target.

13. A method of managing a data capture system, comprising the steps of:
   a) locating a host remotely from the system;
   b) monitoring an operating condition of the system, and detecting a malfunction when the operating condition exceeds a predetermined setting;
   c) reporting the malfunction detected by the monitor to the host; and
   d) automatically correcting the malfunction by having the host communicate with the system.

14. The method of claim 13, wherein the system captures data by sweeping a laser beam from a laser across indicia to be electro-optically read, wherein the monitoring step is performed by monitoring the operating condition of the laser, wherein the reporting step is performed by reporting the laser operating condition to the host, and the step of deenergizing the laser when the laser operating condition is not the preestablished setting.

15. The method of claim 13, wherein the monitoring step is performed by monitoring the operating condition of a temperature of the system, and the step of deactivating the system when the temperature operating condition is not the preestablished setting.

16. The method of claim 14, further comprising the step of scanning the laser beam across the indicia by a drive during reading, wherein the monitoring step is performed by monitoring the operating condition of the drive, and the step of deenergizing the laser when the drive operating condition is not the preestablished setting.

17. The method of claim 13, further comprising the step of adjusting the operating condition of the system when the operating condition is outside the preestablished setting.

18. The method of claim 13, further comprising the step of upgrading the system when the operating condition is outside the preestablished setting.

19. The method of claim 13, wherein the reporting step is performed periodically.

20. The method of claim 13, wherein the reporting step is performed responsively to a poll initiated by the host.

21. A method of managing a data capture system having an electro-optical scan engine for reading machine-readable indicia, comprising the steps of:
   a) locating a host remotely from the system;
   b) monitoring an operating condition of the system, and detecting a malfunction when the operating exceeds a predetermined setting;
   c) reporting, by wireless communication from the system to the host, when the malfunction is detected; and
   d) automatically correcting the malfunction by sending, by wireless communication from the host to the system, in response to the reporting step.

22. The method of claim 21, wherein the host sends control information used to reconfigure the scan engine.

23. The method of claim 21, wherein the operating condition indicates a status of the scan engine.

* * * * *